United States Patent [19]

Spektor et al.

[11] Patent Number: 4,777,495
[45] Date of Patent: Oct. 11, 1988

[54] APERTURE CARD PLOTTER

[75] Inventors: Semyon Spektor, San Francisco; Robert J. Grady, Redwood City; Michael H. Ranger, San Jose; Wilson S. Chinn, Cupertino; Alexander J. McKennon, San Jose; Samuel D. I. Emerson, III, Fremont, all of Calif.

[73] Assignee: NCR Corporation, Dayton, Ohio

[21] Appl. No.: 42,210

[22] Filed: Apr. 24, 1987

[51] Int. Cl.$^4$ .................... G01D 15/10; G01D 9/42; G03B 27/58; G03B 27/62
[52] U.S. Cl. ................................. 346/76 L; 346/108; 346/99; 355/72; 355/75
[58] Field of Search .............. 346/108, 107 R, 76 L, 346/160, 129, 133, 134, 82, 99; 355/72, 75, 18

[56] References Cited

U.S. PATENT DOCUMENTS

| | | | |
|---|---|---|---|
| 2,377,754 | 6/1945 | Bryce | 346/99 |
| 3,797,932 | 3/1974 | Endter | 355/18 |
| 4,613,876 | 9/1986 | Mohr | 355/72 |
| 4,692,394 | 9/1987 | Drexler | 346/76 L |

Primary Examiner—H. Broome
Assistant Examiner—Mark Reinhart
Attorney, Agent, or Firm—Wilbert Hawk, Jr.; Stephen F. Jewett; Douglas S. Foote

[57] ABSTRACT

A plotter for recording data from a modulated laser beam onto a recording medium mounted covering the aperture of an aperture card wherein the aperture is located toward one end of the aperture card with a blank margin on either side of the aperture, the plotter including an aperture card supply module for supplying the aperture card from a plurality of aperture cards, a carriage module having a recording station and a platen member for stepping the aperture card past the recording station, a laser scanning module for scanning a row of data from the modulated laser beam laterally across the recording medium through the recording station as the recording medium is stepped past the recording station by the platen member, a dry developer module for developing the data recorded on the recording medium by the laser scanning module, a feed path from the aperture card supply module through the carriage module and the dry developer module, and transport apparatus for transporting the aperture card along the feed path from the aperture card supply module, through the carriage module and the dry developer module. The plotter also includes a printer module along the feed path for printing titling information on the aperture card.

26 Claims, 13 Drawing Sheets

APERTURE CARD PLOTTER

BACKGROUND OF THE INVENTION

The present invention relates to an apparatus for plotting data on microfilm, and more particularly relates to an apparatus for plotting data on a frame of microfilm mounted on an aperture card. The apparatus also includes a printer mechanism for printing titling information on the aperture card.

U.S. Pat. No. 3,781,902 to Shim et al. issued Dec. 25, 1973 for "Recorder/Processor Apparatus" discloses an apparatus for modulating a laser beam with a video signal, and directing the modulated laser beam onto a recording medium to record an image. The recording medium is processed by the controlled application of heat to develop the image on the recording medium. The recording medium is held onto a drum by a vacuum, and the modulated laser beam is advanced along the recording medium by an optics support carriage.

U.S. Pat. No. 3,787,887 to Burton issued Jan. 22, 1974 for "Optical Recorder With Intensity Control" discloses a control circuit for modulating a laser beam using electro-optic crystals. The modulated laser beam exposes a film which is held on a curved film transport table which is supported by an air bearing and is coupled to a precision ball screw directly driven by a d-c servo motor to provide for smooth and precise film transport.

U.S. Pat. No. 3,797,932 to Endter et al issued Mar. 19, 1974 for "Vibration Isolation Arrangement for Aperture Card Photographic Copying Machine" discloses a photographic copying machine having stations for exposing and processing a photosensitive film insert on an aperture card U.S. Pat. No. 3,874,621 to Blair et al issued Apr. 1, 1975 for "Recording System Using Gas Laser" discloses a recording system in which a gas laser beam modulated by a crystal modulator is focused onto a light sensitive film. The film is driven over a curved air film platen, and the laser beam is scanned thereon by a rotating scanning mirror.

U.S. Pat. No. 4,109,256 to Ohnishi issued Aug. 22, 1978 for "Laser Computer Output Microfilmer" discloses a laser driven computer output microfilmer which includes a laser unit, an optical modulator for modulating a laser beam from the laser unit with data from a computer, a film drive unit for driving a strip of film and apparatus including a rotatable mirror for scanning the modulated laser beam onto the film to form an image.

U.S. Pat. No. 4,332,466 to Flasck issued June 1, 1982 for "Apparatus For Producing Microfilm Records At High Speed From Computer Or Other Electrical Data Signal Sources" discloses an apparatus for producing microform records having an imaging station wherein a strip of masking film is exposed to light for forming an image thereon, and the film is advanced to a developing station wherein heat is applied to the film from a heating bar for developing the image on the film.

U.S. Pat. No. 4,501,487 to McCormick-Goodhart issued Feb. 26, 1985 for "Microfiche Recording Apparatus and Method With Stationary Film Head" discloses a microfiche recording apparatus having a strip of intermediate film which is advanced through an imaging station wherein the film is exposed to light for forming an image thereon, and from there through a developing station wherein a hot shoe is brought into contact with the film by a shoe lifting solenoid for developing the image on the film.

SUMMARY OF THE INVENTION

In a specific embodiment, a plotter is disclosed for recording data from a modulated laser beam onto a recording medium mounted over the aperture of an aperture card wherein the aperture is located toward one end of the aperture card with a blank margin on either side of the aperture, the plotter including an aperture card supply module for supplying the aperture card from a plurality of aperture cards, a carriage module having a recording station and a platen member for stepping the aperture card past the recording station, a laser scanning module for scanning a row of data from the modulated laser beam laterally across the recording medium through the recording station as the recording medium is stepped past the recording station by the platen member, a dry developer module for developing the data recorded on the recording medium by the laser scanning module, a feed path from the aperture card supply module through the carriage module and the dry developer module, and transport apparatus for transporting the aperture card along the feed path from the aperture card supply module, through the carriage module and the dry developer module.

It is an object of the invention to provide an aperture card plotter having a first module for supplying a card having light sensitive film over an aperture, a second module for receiving the aperture card from the first module and stepping the light sensitive film past an exposure station, a third module for transmitting a modulated laser beam to the exposure station of the second module for forming an image on the light sensitive film, and a forth module for receiving the aperture card from the third module and moving it into contact with a heating element for developing the image on the light sensitive film.

It is a further object of the invention to provide an aperture card plotter having an apparatus for recording an image on microfilm over the aperture of an aperture card, and a printer module for printing titling information on the aperture card.

It is a further object of the invention to provide an aperture card plotter having a cassette mount module including an apparatus for receiving a cassette loaded with aperture cards, a pick off mechanism for stripping a single aperture card from the cassette, and a feed mechanism for feeding the stripped off aperture card to an image recording module.

It is a further object of the invention to provide an aperture card plotter having a carriage module including a platen mechanism for receiving an aperture card which has a recording medium thereon and for positioning the recording medium exactly over a recording station such that the recording medium may be stepped past the recording station for scanning an image thereon.

These and other objects of the present invention will become apparent from the drawings and description of the preferred embodiment disclosed herein.

DESCRIPTION OF THE PREFERRED EMBODIMENT

Co-owned U.S. Pat. No. 4,613,876 to Mohr issued Sept. 23, 1986 for "Laser Recording System", incorporated herein by reference, discloses a recording system for recording an image with a laser onto film covering the aperture of an aperture card.

Figure 1:
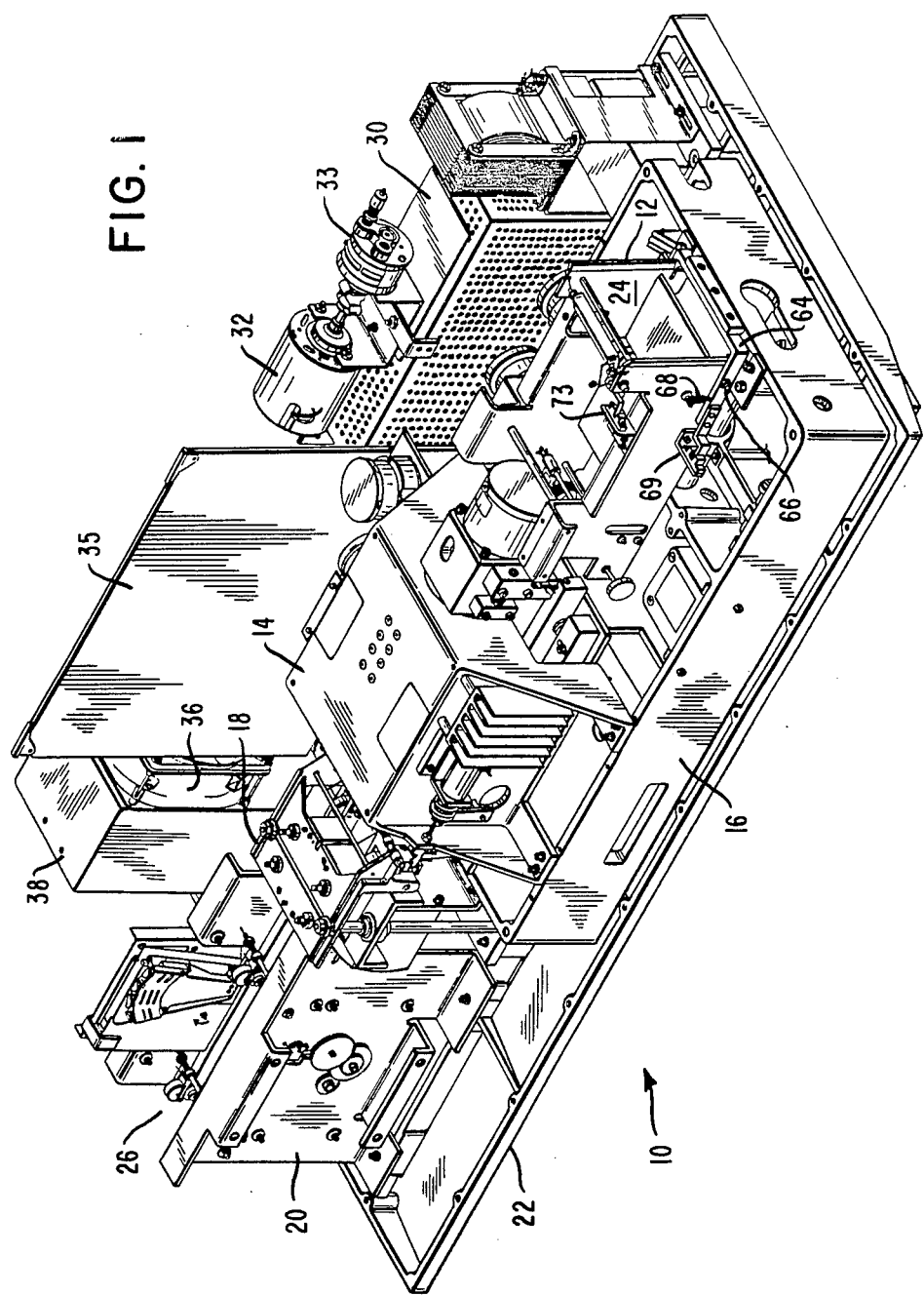
FIG. 1 is a perspective view of an aperture card plotter of the present invention with its light-tight cabinet removed such that the component modules are exposed.

FIG. 1 of the drawings hereof is a perspective view of an aperture card plotter 10 of the present invention, and includes a cassette mount module 12, a carriage module 14, a laser module 16, a dry developer module 18, and a printer module 20. The laser module 16, the dry developer module 18 and the printer module 20 are mounted on a suitable base support 22, as shown. The cassette mount module 12 and the carriage module 14 are mounted on the laser module 16. All of the modules 12, 14, 16, 18 and 20 are aligned such that a continuous feed path for an aperture card, to be described further, is provided from module to module throughout the aperture card plotter 10. The feed path starts with a cassette receiving opening 24 for receiving an aperture card cassette 80 (to be discussed in connection with FIG. 6), and continues through the carriage module 14 wherein light sensitive film mounted on the aperture card will be exposed by a scanning laser beam from the laser module 16, as will be explained. The feed path continues from the carriage module 14, through the dry developer module 18 wherein the exposed film on the aperture card is developed, through the printer module 20 wherein identifying information may be printed on the aperture card, and from there to a card exit 26 through which the completed aperture card is ejected.

The aperture card plotter 10 also includes a power supply module 30 having a vacuum pump motor 32, and a vacuum pump 33 for use by the carriage module 14, to be explained, and a printed circuit board panel 35 on which is mounted the electronics and computer interface circuitry of the aperture card plotter 10. A cooling fan 36 is provided which draws in air through an appropriate plenum 38 and forces it over the electronics on the panel 35 and the various modules of the aperture card plotter 10.

Figure 2:
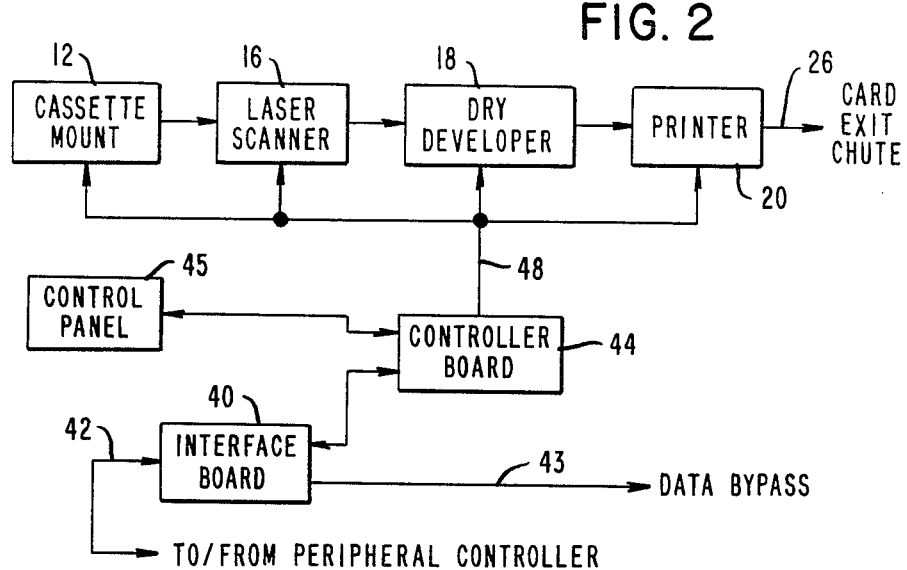
FIG. 2 is a functional block diagram of the aperture card plotter of FIG. 1.

FIG. 2 is a functional block diagram of the plotter 10 of FIG. 1. An interface board 40 is provided which is connected to a peripheral controller, not shown, by a data bus 42. A data bypass 43 is also connected to the interface board 40 for the bypassing of data from the peripheral controller data bus 42 to, for instance, other peripherals or processors as desired. A controller board 44 is connected to the interface board 40 and controls the plotting of data on an aperture card, as will be explained. Also connected to the controller board 44 is a control panel 45 which contains an on/off switch, various status indicators, and controls for controlling, for instance, the intensity of the pixel data to be plotted on an aperture card. The controller board 44 is connected to the various modules of the aperture card plotter 10 of FIG. 1 by a control and data bus 48 over which various control signals are sent to control the progress of an aperture card through the various modules of the aperture card plotter 10 and the plotting of data thereon. It will be understood that computer generated data may be sent by a peripheral controller (not shown) over the data bus 42 for use by the aperture card plotter 10. Preferably, the interface board 40 of FIG. 2 receives the computer data in a conventional format and uses a conventional protocol such that the aperture card plotter 10 may be written to in the same manner as a conventional computer printer/plotter device.

Figure 3:
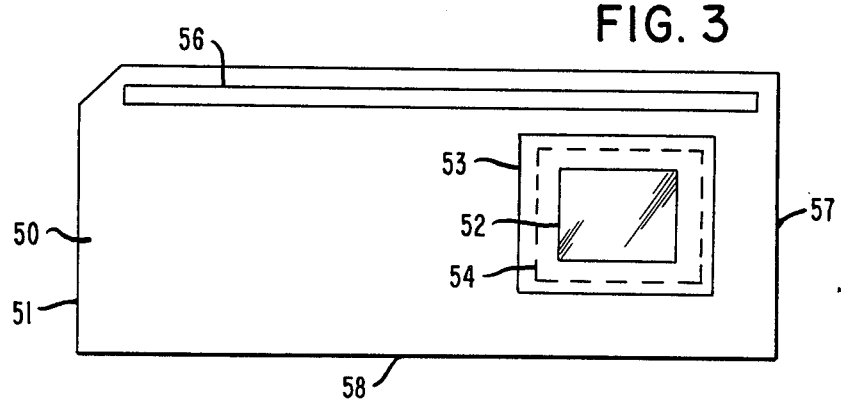
FIG. 3 is a top plan view of an aperture card usable with the aperture card plotter of FIG. 1.

FIG. 3 shows an aperture card 50 usable with the plotter 10 of FIG. 1. The aperture card 50 is of a standard size and format usable with conventional aperture card microfilm viewers. The card 50 includes an aperture or opening 52 over which is mounted a microfilm carrier 53. Trapped between the microfilm carrier 53 and the card 50 is microfilm 54 in a 35 mm format. The microfilm 54 may be any of a number of films which may be exposed by a light beam from a laser, and which may be developed by exposure to heat. Such a film is available from Eastman Kodak Company of Rochester, N.Y., under the name Recordak Dacomatic DL film 2471. The aperture card 50 further includes a title block area 56 in which 80 characters of titling information may be printed by the printer module 20, to be explained. The aperture card 50 is directed through the mentioned feed path of the plotter 10 such that it has a leading end 51, a trailing end 57, and a left edge 58.

Figure 4:
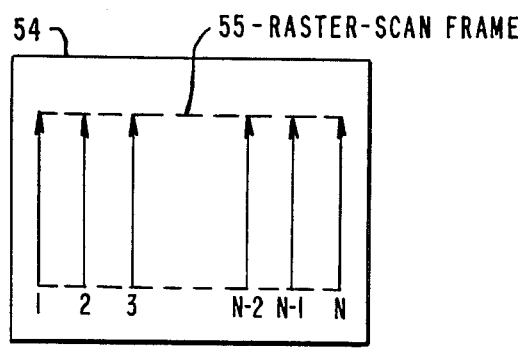
FIG. 4 is a diagram of a raster-scan frame of the aperture card of FIG. 3.

FIG. 4 shows an enlargement of the microfilm 54 of the aperture card 50. A raster scan frame 55 is located in the center of the microfilm 54 and is divided into a plurality of scan lines numbered 1-n, with each scan line broken into a plurality of pixels, not shown. Computer data is fed over data bus 42 of FIG. 2 to the laser scanner module 16 by circuitry on the controller board 44 such that a laser beam is modulated with the data in a series of dots or pixels. The carriage module 14 of FIG. 1 is stepped in conjunction with scanning from the laser scanner module 16 such that an aperture card 50 is stepped each scan line, and each scan line receives one line of modulated computer data, as will be explained.

In the present apparatus, the aperture card 50 may be stepped through the carriage module 14 in 4.23 micron steps with a pixel spaced every 4.23 microns along each scan line. The modulating of the computer data on a laser beam will be discussed further in conjunction with the description of the laser scanner module 16, and the stepping of the aperture card 50 from scan line to scan line will be discussed further in connection with the description of the carriage module 14.

Figure 5:
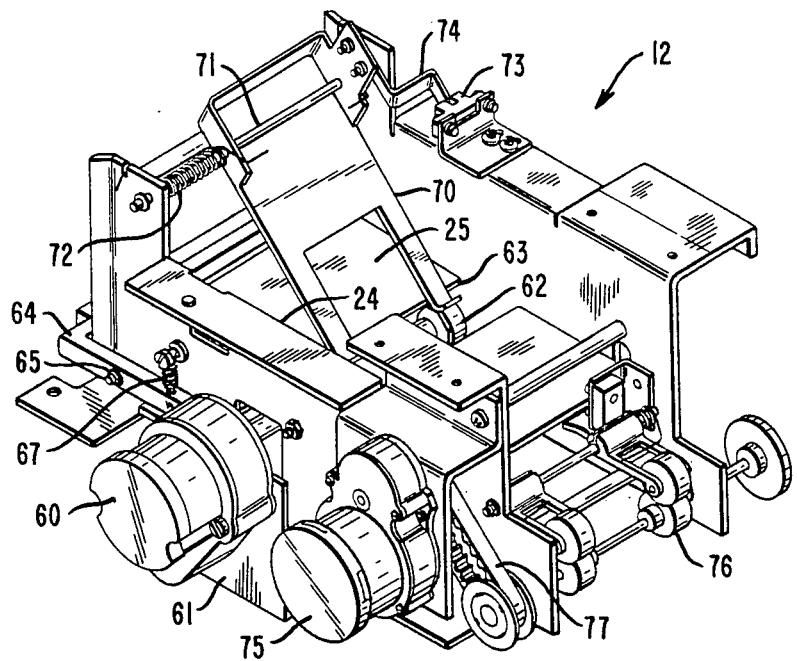
FIG. 5 is a rear perspective view of a cassette mount module of the aperture card plotter of FIG. 1.

FIG. 5 is a perspective view from the rear of the cassette mount module 12, which includes a pick off motor 60 for driving a pick off roller assembly 62 extending through a slot 63 in the floor 25 of the cassette receiving opening 24. The pick off motor 60 and pick off roller assembly 62 are mounted on a bracket 61 which is mounted on a pivoted gate member 64. The pivoted gate member 64 pivots around pivot members 65 and 66 (see FIG. 1). The gate member 64 is urged into a normal loading position by spring members 67 and 68 (see FIG. 1) such that when the gate member 64 is in its normal position, the pick off roller assembly 62 is urged into the slot 63 for stripping an aperture card 50 out of a cassette 80 (see FIG. 6) in the cassette receiving opening 24, as will be explained. A sensor 69 (see FIG. 1) senses when the gate member 64 is in its normal loading position A feeler member 70 pivots around a bar 71 such that when the open topped cassette 80 is inserted into the cassette receiving opening 24, the feeler member 70 extends down into the open cassette 80 to apply loading pressure to, and sense the presence of, aperture cards 50 within. The feeler member 70 is spring loaded by a spring 72 for applying pressure to the aperture cards 50 stacked in the cassette. An optical sensor 73 senses a flag member 74 on the feeler member 71. The flag member 74 is adjusted such that a signal is sent from the cassette mount module 12 to the controller board 44 over the bus 48 (see FIG. 2) when the cassette 80 in the cassette mount module 12 is empty. The pivoted gate member 64 may be linked to a door (not shown) of a light-tight cabinet (not shown) which pivots the gate member 64 to its unloaded position when the door is opened. After a loaded cassette is inserted into the cassette receiving opening 24, the gate member 64 may be pivoted to its loaded position, such as by closing the described cabinet door. The sensor 69 of FIG. 1 would then indicate that the gate member 64 is in its loaded position, and the sensor 73 would indicate that the cassette 80 contains aperture cards 50. A feed motor 75 is mounted at the rear of the cassette mount module 12 for driving a pinch roller assembly 76 via a drive belt 77. The pick off motor 60 drives the pick off roller 62 and the feed motor 75 drives the pinch roller assembly 76 at the same speed such that an aperture card 50 stripped out of the cassette 80 by the pick off roller assembly 62 engages the pinch roller assembly 76 and is transported smoothly out of the cassette module 12 to the carriage module 14.

Figure 6:
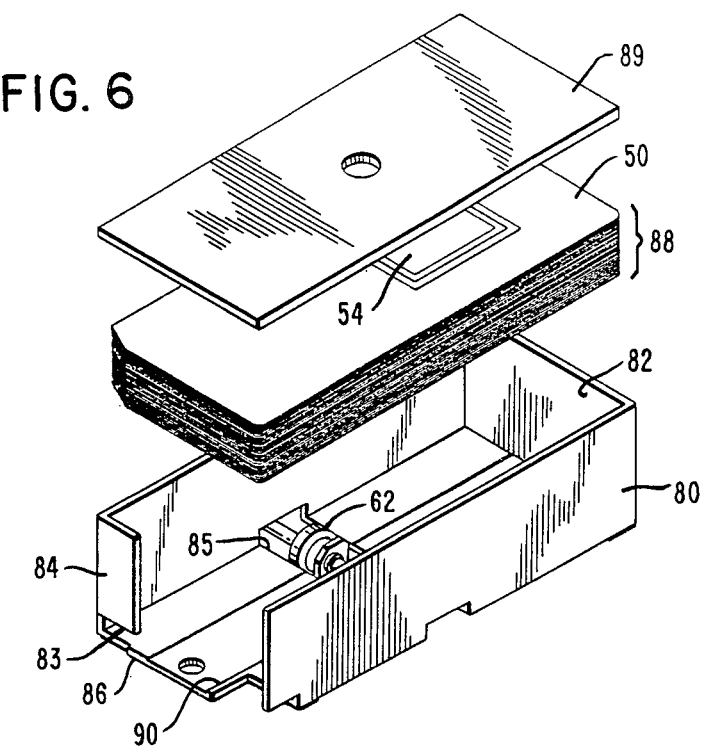
FIG. 6 is an exploded view of a cassette usable with the cassette mount module of FIG. 5.

Referring to FIG. 6, the cassette 80 has an open top 82, and includes a feed slot 83 in one end 84. A slot 85 is located in its bottom member 86 and is positioned to register with the slot 63 in the bottom of the cassette mount module 12 (see FIG. 5) when the cassette 80 is completely pushed into the cassette receiving opening 24 to its final position. The pick off roller assembly 62 of the cassette mount module 12 is shown in the slot 85 of FIG. 6 as it would appear when the cassette 80 is fully inserted into the cassette mount module 12 and the gate member 64 is in its normal loading position. In operation, a stack 88 of aperture cards 50 is located in the cassette 80 with a weight 89 placed on its top. A central trough 90 is provided down the center of the bottom member 86 of the cassette 80 such that the microfilm 54 on each aperture card 50 does not touch or drag against the bottom member 86 as the aperture card is stripped out of the cassette 80 by the pick off roller assembly 62 and advanced into the carriage module 14 by the pinch roller assembly 76. A blank card may be positioned at the bottom of the stack 88 and the weight 89 positioned on top for forming a light-tight cassette 80 which may be handled in the daylight for insertion into the cassette mount module 12 without exposing the microfilm 54 to light. The described blank card (not shown) may then be stripped out of the cassette 80 such that the next card fed through the plotter 10 will contain an unexposed microfilm 54 ready for exposure by the laser scanner module 16, as will be described.

Figure 7:
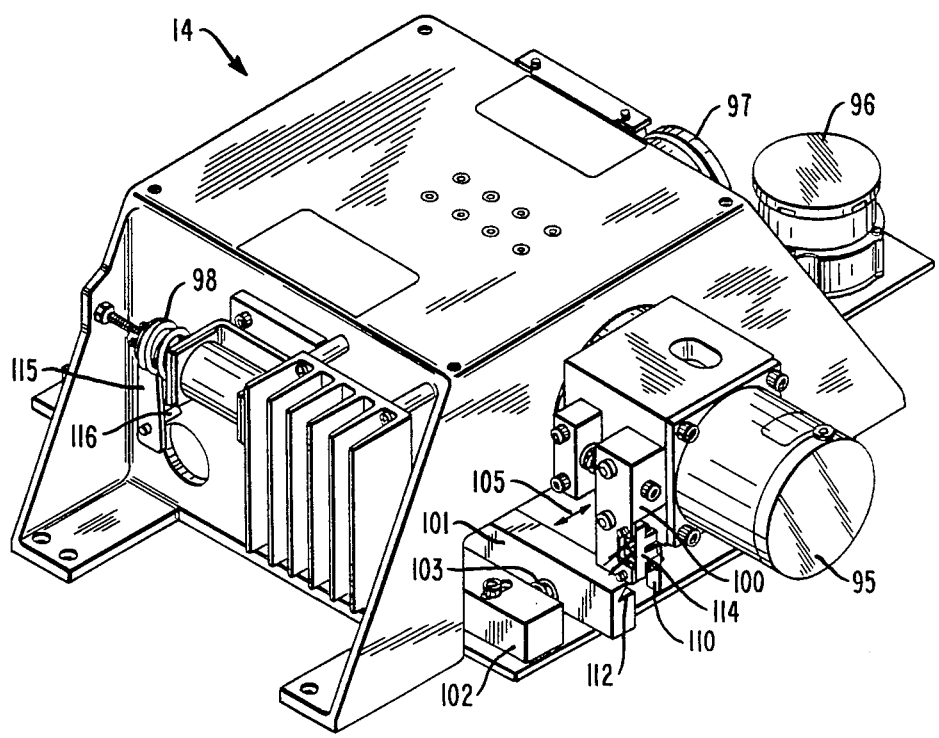
FIG. 7 is a front perspective view of a carriage module of the aperture card plotter of FIG. 1.

Referring to FIG. 7, the carriage module 14 has a stepper motor 95 which steps a platen assembly 150 (see FIGS. 9-12) for holding an aperture card 50 during the scanning process A card bend motor 96 and a card feed motor 97 are located on the right side of the carriage module 14, and a pinch solenoid 98 is located on its left side. A sensor mechanism 100 is located in the front portion of the carriage module for locating the position of the aperture card 50 as it moves through the carriage module 14, as will be described. A movable card guide 101 is located in the carriage module 14 for guiding the left edge 58 (see FIG. 3) of an aperture card 50 as it moves into position in the carriage module 14. The movable guide 101 is attached to a fixed member 102 by spring mounts, one of which is shown at 103, for allowing the movable guide 101 to be moved in a lateral direction as shown by directional arrows 105. The sensor mechanism 100 includes a hanging flag member 110 which is pivoted to hang down into the path of an aperture card 50 moving into a notch 112 in the movable guide member 101. The sensor mechanism 100 also includes an optical sensor 114 divided by a slot and having a light emitting diode on one side and a photo transistor on the other, with a bent portion of the hanging flag member 110 normally in the slot therebetween. When a card 50, moving into the notch 112 of the movable member 102, strikes the lower portion of the hanging flag member 110, its bent portion is moved out of the slot dividing optical sensor 114 thereby turning on the photo transistor and providing a signal which may be sensed by circuitry in the controller board 44 (See FIG. 2).

The carriage module 14 includes a pivoted lever 115 having one end connected to the plunger of the pinch solenoid 98, and having its other end fastened to a rotatable shaft 116. Thus when the solenoid 98 is actuated, the shaft 116 is rotated to move a pinch roller mechanism 118 into contact with drive wheels 120 which are turned by the card feed motor 97 (see FIGS. 8 and 9).

Figure 8:
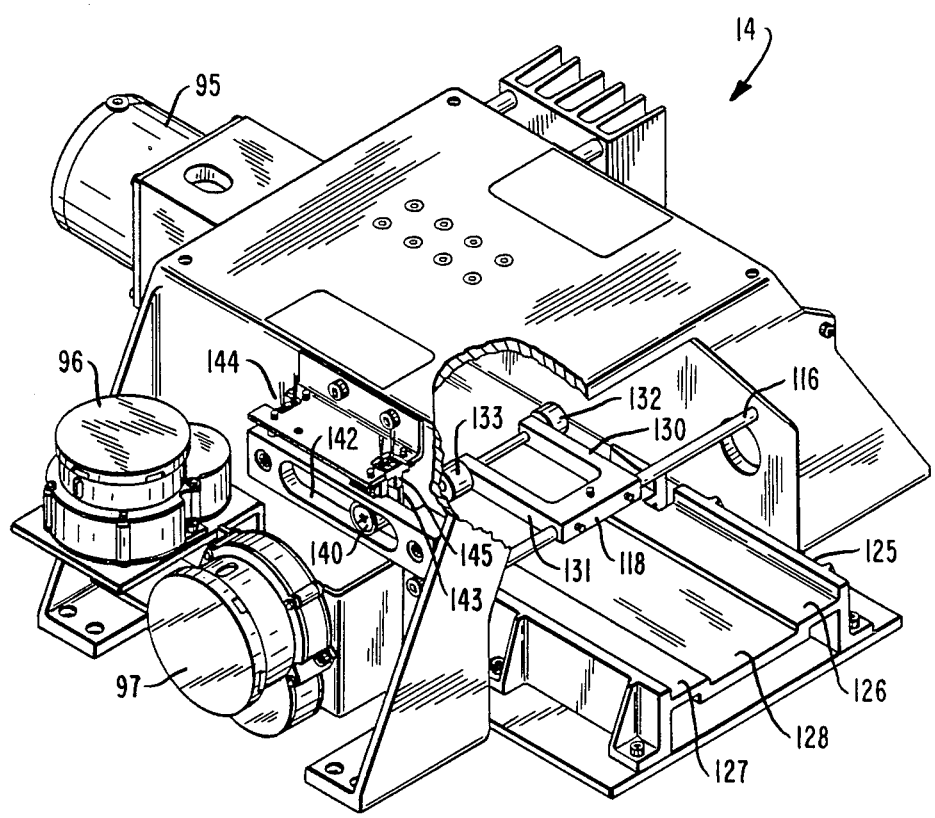
FIG. 8 is a rear perspective view of the carriage module of FIG. 7.

FIG. 8 is a perspective view of the rear of the carriage module 14. Extending from the rear of the carriage module 14 is a table member 125 along which an exiting aperture card 50 slides. The table member 125 includes a pair of flat guide surfaces 126 and 127 with a trough area 128 therebetween. It will be understood that as the aperture card 50 exits the carriage module 14, the exposed microfilm 54 will slide over the trough portion 128 such that the aperture card 50 touches only the guiding surfaces 126 and 127 of the table member 125. The pinch roller mechanism 118 includes a pair of arms 130 and 131 which terminate in rollers 132 and 133, respectively, for contacting the aperture card 50 on its margins on either side of the 35 mm film 54. When the pinch solenoid 98 of FIG. 7 is energized, the rollers 132 and 133 of the pinch roller mechanism 118 are urged downwardly such that an aperture card 50 may be trapped between the rollers 132 and 133 and the drive wheels 120 which are driven by the card feed motor 97 (see FIG. 9).

A follower arm 14, which is part of the sliding platen assembly 150, rides in a slot 142, and includes a blade member 143 extending upwardly such that it may be sensed by a right sensor 144 and a left sensor 145. Sensors 144 and 145 define the limits of travel of the follower arm 140 and the attached platen assembly 150.

Figure 9:
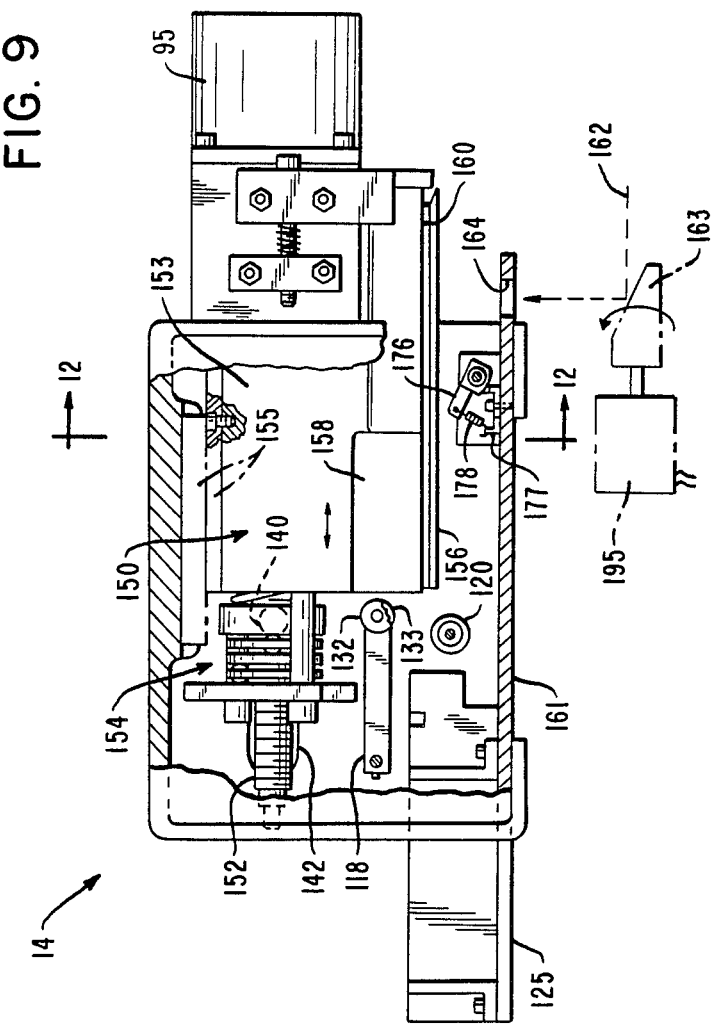
FIG. 9 is a left side elevational view of the carriage module of FIG. 7 with the side broken away such that a platen assembly is exposed.

FIG. 9 is a left side view of the carriage module 14 with the case of the carriage module 14 broken away such that the platen assembly 150 is exposed. The stepper motor 95 turns a lead screw 152 which drives the platen assembly 150 leftwardly or rightwardly as viewed in FIG. 9. The platen assebly 150 includes a platen member 153 which is connected to the lead screw 152 by an anti-backlash nut and gimbal assembly 154. The anti-backlash nut and gimbal assembly 154 isolates any transverse motions of the lead screw 152 from the platen member 153 such that the platen member 153 is driven smoothly between the limits defined by the sensors 144 and 145 of FIG. 8. The follower arm 140 extends from the anti-backlash nut and gimbal assembly 154 of FIG. 9 through the slot 142, as previously described The platen assembly 150 is suspended from the top of the carriage module 14 by a very accurate sliding mechanism 155 which allows very accurate sliding movement of the platen assembly 150 within the carriage module 14. This very accurate sliding movement enables the aperture card plotter 10 to plot very accurate, closely spaced, parallel lines and fine detail on the microfilm 54 of the aperture cards 50. The sliding mechanism 155 may be an IKO cross roller way unit available from IKO International of Arlington Heights, Ill. 60005. The platen member 153 has a fixed guide member 156 attached along the bottom thereof which is parallel with the movable guide member 101 on the other side of the carriage module 14 (see FIG. 12). The platen member 153 has an open portion 158 which moves around the free end of the pinch roller assembly 118 as the platen assembly 150 moves to the left in FIG. 9. A curved face 160 is provided on the right most portion of the platen member 153 to hold an aperture card 50. The radius of the curved face 160 provides a constant distance for a laser beam 162 reflected from a spinning mirror 163 through a window or slot 164 in the bottom 161 of the carriage module 14. The laser beam 162 is modulated, as will be explained, to form an image on the microfilm 54 of the aperture card 50.

Figure 10:
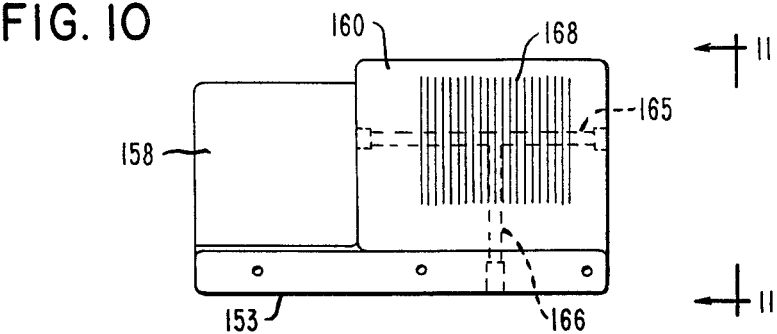
FIG. 10 is a bottom elevational view of a platen member of the platen assembly of FIG. 9.
Figure 11:
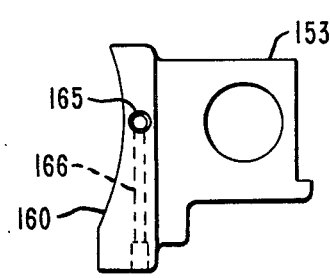
FIG. 11 is an end view of the platen member taken along line 11—11 of FIG. 10.

As shown in FIGS. 10 and 11, the platen member 153 includes vacuum passages 165 and 166 through which air is drawn by the vacuum pump 33 of FIG. 1. A plurality of vacuum slots 168 connected to passages 165 and 166 are provided to hold an aperture card 50 securely in place during the scanning process.

Figure 12:
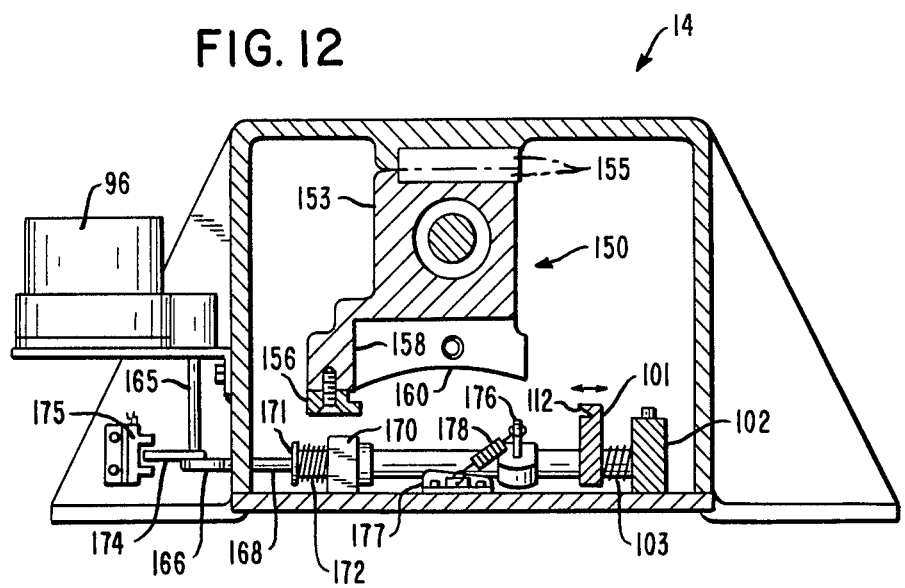
FIG. 12 is a sectional view of the carriage module taken along line 12—12 of FIG. 9.

Referring to FIG. 12, the bend motor 96 is connected by appropriate linkage to the movable guide member 101 to bend an aperture card 50 such that it may be sucked up into tight engagement with the curved face 160 of the platen member 153 for positioning the aperture card 50 during scanning. A motor shaft 165 from the bend motor 96 drives an eccentric wheel 166 which acts against a rod 168 to control the lateral movement of the guide member 101 (see FIG. 7 at 105). The rod 168 is supported by a support block 170 and includes a keeper 171. A spring 172 is trapped between the keeper 171 and the support block 170 such that when the rod 168 is moved to the right in FIG. 12 by the eccentric wheel 166, the spring 172 is compressed. When the bend motor 96 rotates the shaft 165 180 degrees from the position shown in FIG. 7, the eccentric wheel 166 allows the spring means 103 and the spring 172 to urge the movable guide member 101 to its inward position (to the left in FIG. 12). A flag member 174, also mounted on the bend motor shaft 165, is sensed by an optical sensor 175 to sense the position of the eccentric 166 and thus the position of the movable guide member 101 linked thereto. A kicker lever 176 is connected to the rod 168 and rides on an inclined member 177 such that when the movable guide member 101 is moved inwardly, the kicker lever 176 kicks the solid portion of the aperture card 50 whose edges are in the guides formed by the notch 112 and the guide member 156 such that the card 50 is bent upwardly as the movable guide member 101 is moved inwardly. The kicker lever 176 is urged by a spring 178 to return the kicker lever 176 to its lowered position when the bend motor 96 moves the guide member 101 to its outward position to receive a new aperture card 50.

Figure 13:
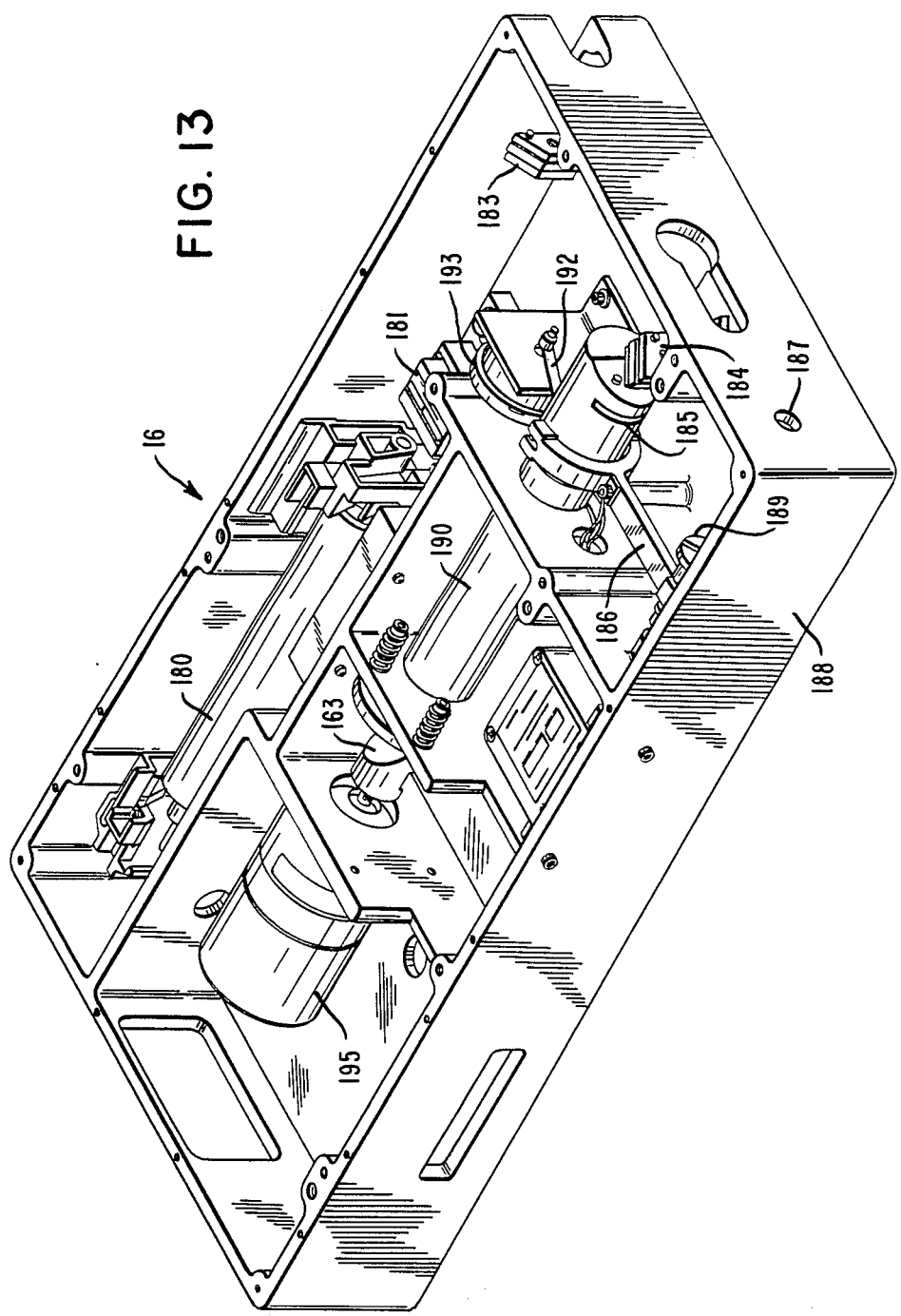
FIG. 13 is a front elevational view of a laser module of the aperture card plotter of FIG. 1.

FIG. 13 shows a perspective view of the laser module 16 of the plotter unit 10 in FIG. 1 The laser module 16 includes a coaxial style helium-neon laser 180 which provides the basic light source for the optical scanner module 16 A narrow, continuous light beam is transmitted by the laser 180 through an acousto-optical modulator 181. The acousto-optical modulator 181 contains a crystal, not shown, which is bonded to a piezo electric transducer for inducing compression waves in the crystal responsive to an electrical signal This compression wave modulates pixel information onto the laser light beam, as is known. The modulator 181 may be a Model No. 3080-16 modulator available from Crystal Technology Division of Siemens Corporation. The modulated laser beam is reflected by a pair of 45 degree angle deflection mirrors 183 and 184 into an optical focusing assembly 185. The optical focusing assembly 185 includes a pivoted yoke member 186 which may be manually adjusted through an access hole 187 in the case 188 of the laser module 16 by means of a screw adjustment 189 to focus the laser beam 162 (see FIG. 9) through a lens member 190 and onto the rotating mirror 163 The rotating mirror 163 is turned by a motor 195. The optical focusing assembly 185 includes a shutter member 192 driven by a shutter motor 193 for intercepting the laser beam shining through the optical focusing assembly 185.

Figure 14:
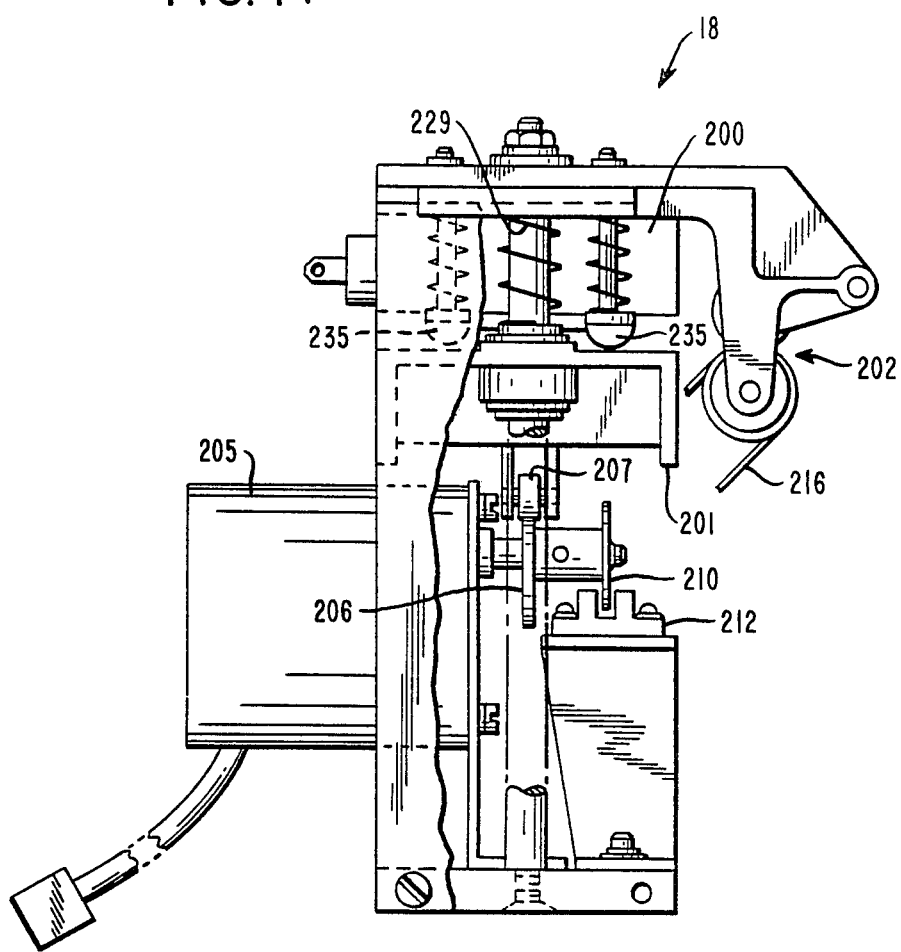
FIG. 14 is a left side elevational view of a dry developer module of the aperture card plotter of FIG. 1.

FIG. 14 is a side view of the dry developer module 18 of the plotter assembly 10 of FIG. 1. The dry developer module 18 includes a heater block 200 for applying heat to the microfilm 54 of an aperture card 50, a card transport mechanism 201 for moving the aperture card 50 into contact with the heater block 200, and a pinch roller mechanism 202 for feeding the card 50 into the dry developer module 18 from the carriage module 14. A motor 205 rotates an eccentric wheel 206 which bears against a ball bearing 207 of the card transport mechanism 201. A flag member 210 moves in conjunction with the eccentric wheel 206, and is sensed by an optical sensor 212 for determining the position of the eccentric wheel 206 and thus the card transport mechanism 201.

Figure 15:
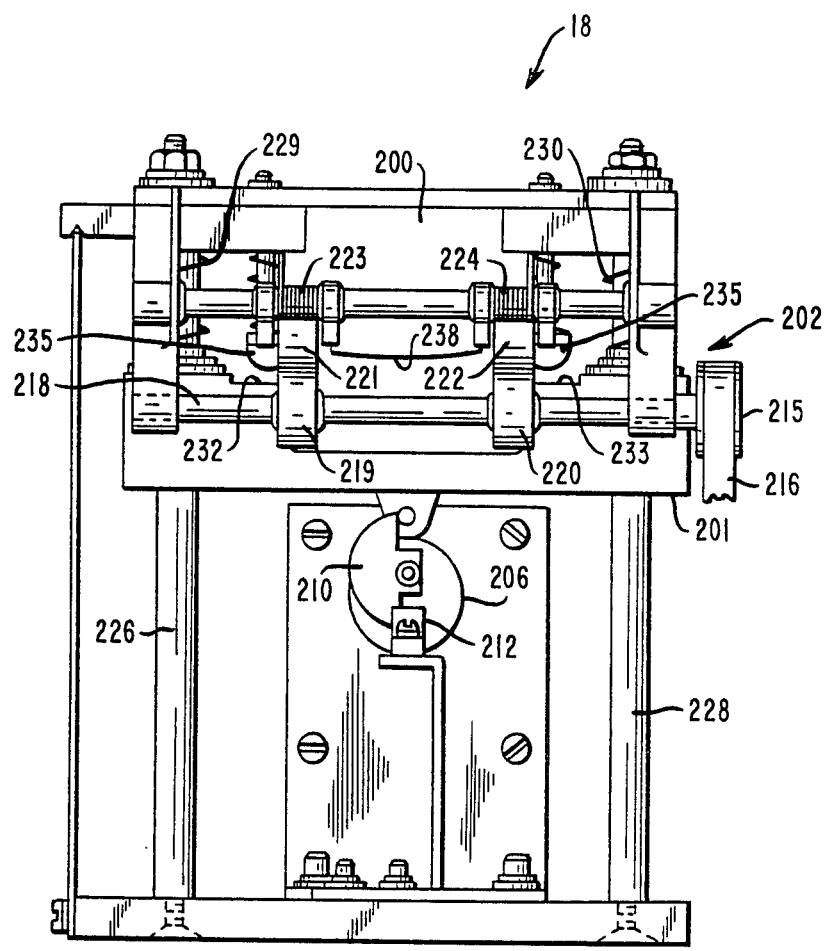
FIG. 15 is a front elevational view of the dry developer module of FIG. 14.

FIG. 15 is a front elevational view of the dry developer module 18. The card feed mechanism 202 includes a sprocket wheel 215 which is driven by a belt 216. The sprocket wheel 215 is connected to a rotary shaft 218 which rotates driver wheels 219 and 220. Pinch rollers 221 and 222 are urged against the driver wheels 219 and 220, respectively, by springs 223 and 224. The card transport mechanism 201 rides upwardly and downwardly on a pair of vertical shafts 226 and 228. Springs 229 and 230 on the shafts 226 and 228, respectively, push the card transport mechanism 201 downwardly against the eccentric wheel 206 (see FIG. 14). As an aperture card 50 is being fed into the dry developer module 18 by the card feed mechanism 202, the card 50 is guided into position by guide means 232 and 233. When the aperture card 50 is in place such that the exposed microfilm 54 is directly under the heater block 200, the motor 205 is energized to raise the card transport mechanism 201 to its uppermost position. As the card transport 201 is raised, the aperture card 50 is trapped between the guide surfaces 232, 233 and a set of spring loaded plungers 235. The eccentric wheel 206 continues to raise the card transport mechanism 201 until the microfilm 54 of the card 50 is tightly stretched over a curved face 238 of the heater block 200. The film 54 is held in contact with the heater block 200, which is heated to a temperature of 245 degrees Farenheit, for approximately 3.5 seconds to develop the image on the exposed microfilm 54. After the microfilm 54 is developed, the motor 205 is again energized to rotate the eccentric wheel 206 another 180 degrees, lowering the card transport mechanism 201 such that the card 50 may be advanced to the printer module 20 of the plotter device 10.

Figure 16:
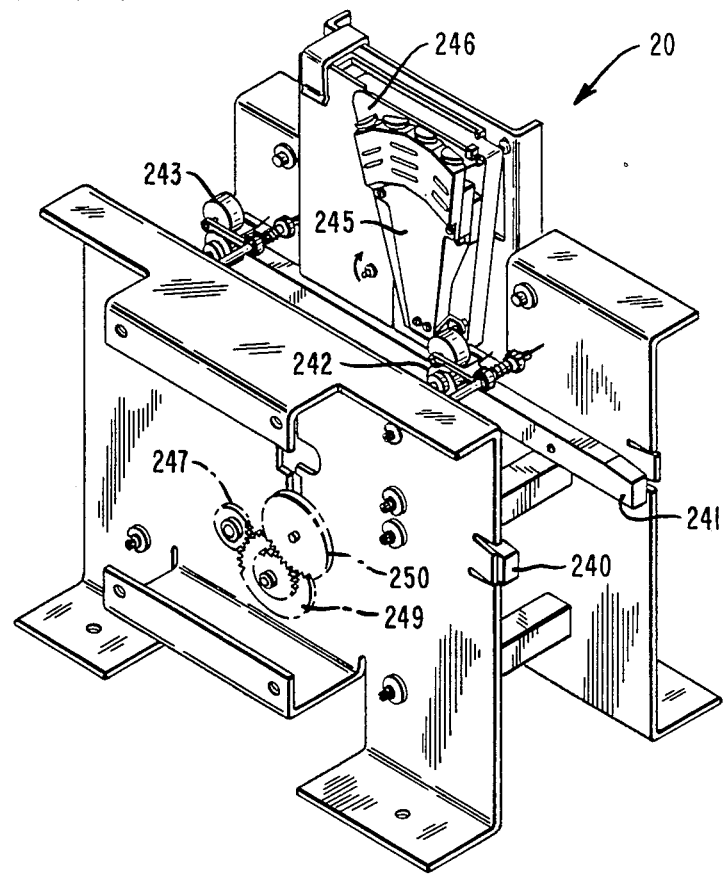
FIG. 16 is a front perspective view of a printer module of the aperture card plotter of FIG. 1.

FIG. 16 is a front perspective view of the printer module 20 of the plotter device 10 of FIG. 1. Parallel rails 240 and 241 are provided for guiding an aperture card 50 from the dry developer module 18 into the printer module 20 Feed roller assemblies 242 and 243 advance the aperture card 50 through the printer module 20, as will be explained. A print head 245 having a plurality of print wires 246 prints a single row of characters in the title block area 56 of the aperture card 50 (see FIG. 3). A motor drive gear 247 is driven by a printer motor 248 (see FIG. 17) and drives an idler gear 249, which in turn drives a card feed drive gear 250, which drives the forward feed roller assembly 242.

Figure 17:
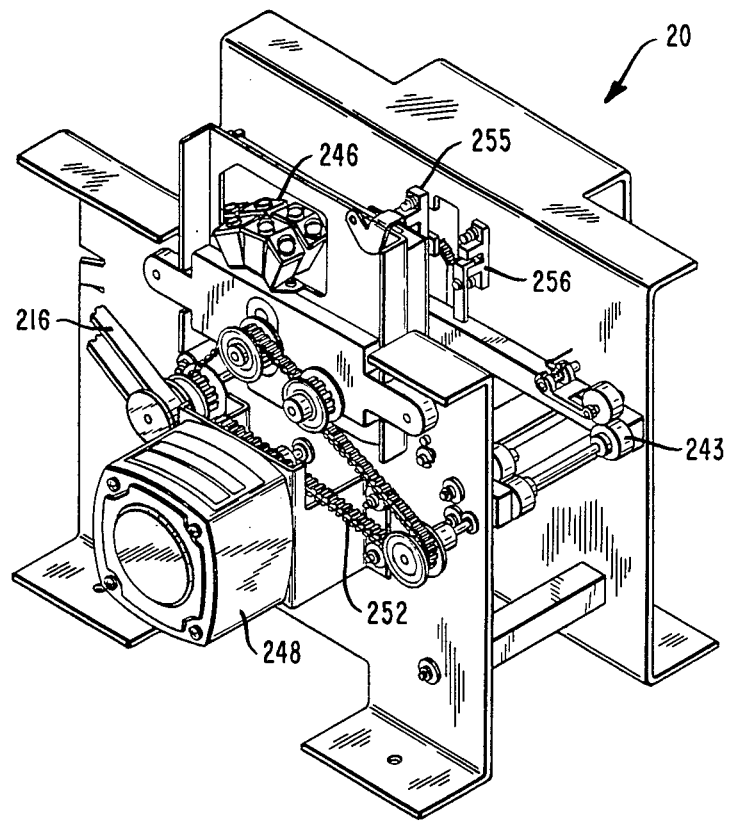
FIG. 17 is a rear perspective view of the printer module of FIG. 16.

FIG. 17 is a rear perspective view of the printer module 20, which includes the printer motor 248 for driving the motor drive gear 247 of FIG. 16, the belt 216 to the dry developer module 18 (see FIGS. 14 and 15), and a timing belt 252 for driving the rear most feed roller assembly 243 Hanging flag optical sensors 255 and 256, which are similar to the sensor mechanism 100 of FIG. 7, are provided for sensing the location of an aperture card 50 as it advances through the dry developer module 18 and the printer module 20. The forward most optical sensor 255 senses the leading end 51 (see FIG. 3) of the aperture card 50 as it is advanced approximately halfway into the printer module 20. The printer module 20 is spaced from the dry developer module 18 a sufficient distance such that when the leading end 51 of the aperture card 50 is sensed by sensor 255, the microfilm 54 of the aperture card 50 is correctly located directly under the heater block 200 of the dry developer module 18. When the leading end 51 is sensed by sensor 255, the motor 248 is stopped, stopping the card feeder assemblies 202, 242 and 243. After the aperture card 50 is developed by the dry developer module 18, as described in connection with FIGS. 14 and 15, the location of the card 50 may have shifted sufficiently that printing cannot be accurately located in the title block area 56 of FIG. 3. For this reason, a second hanging flag optical sensor 256 is located behind the optical sensor 255 for sensing the leading end 51 of the aperture card 50 after the printer motor 248 is restarted.

Figure 18:
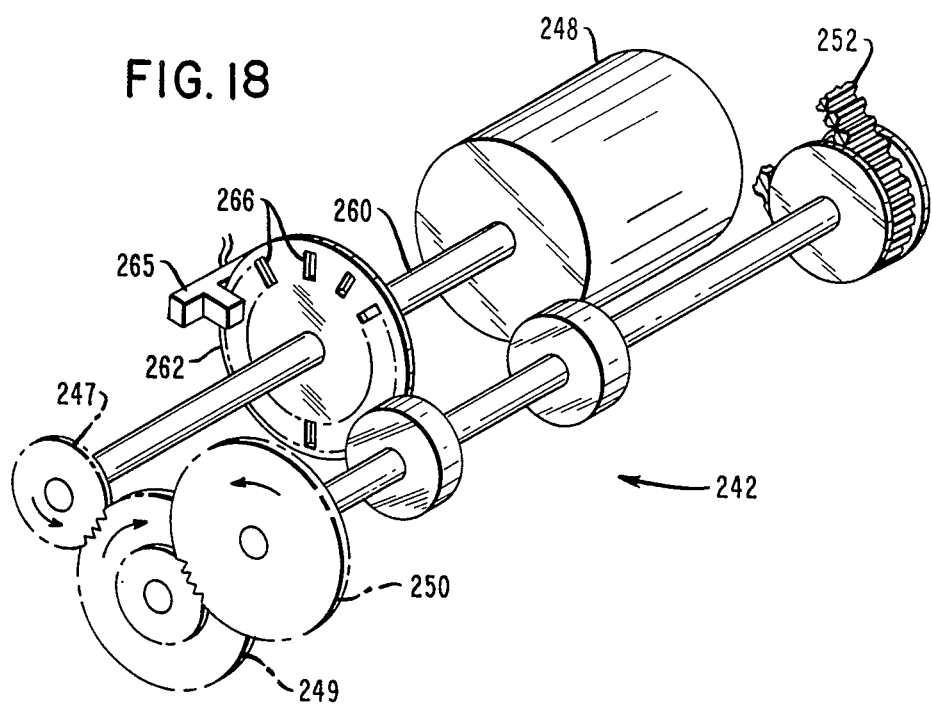
FIG. 18 is a diagramatic illustration of the timing mechanism of the printer module of FIGS. 16 and 17.

FIG. 18 is a schematic representation of the timing mechanism of the printer module 20. The printer motor 248 rotates a shaft 260 which rotates the motor drive gear 247, previously explained. Also rotated by the shaft 260 is a 36 slot encoded disk 262 whose slots are detected by an optical decoder 265. The output speed of the printer motor is 300 revolutions per minute (five revolutions per second). The encoder disk is divided into 36 ten degree segments, with each ten degree segment containing a five degree slot 266. As each segment rotates through the optical path of the decoder 265, a square wave output is produced as the decoder 265 is alternately turned on and off. The output signal of the optical decoder 265 is equivalent to 180 hertz (36 slot times 5 revolutions per second equals 180 hertz). This signal is transmitted to circuitry in the controller board 44 of FIG. 2 for tracking the shaft angle and hence the aperture card location as the aperture card 50 moves through the printer module 20. The signal from the optical decoder 265 is thus used as a clock reference signal to define the dot matrix location and/or spacing for printing title characters on the aperture card 50 by the print wires 246 of the printer module 20. The clock signal from the sensor 265 may also be used to determine when the aperture card has completely rolled through the rear most card feed assembly 243 and exited the plotter device 10 at 26 (see FIG. 1).

The operation of the aperture card plotter 10 will now be discussed. As shown in FIG. 6, a stack 88 of aperture cards 50 is placed in a cassette 80. The bottom card 50 is blank, and a weight 89 is placed on top of the stack 88 to make the cassette light-tight. Referring to FIG. 5, the pivoted gate member 64 is raised, lowering the bracket 61 and attached pick off motor 60 and pick off roller assembly 62. The cassette 80 is then inserted into the cassette receiving opening 24, moving the feeler member 70 to push on the weight 89 on top of the stack 88 of cards 50 in the cassette 80. When the cassette 80 is in place, the pivoted gate member 64 is returned to its normal loading position, moving the pick off roller assembly 62 into contact with the lowest card 50 in the stack 88. The sensor 69 of FIG. 1 senses that the pivoted gate member 64 is in its loaded position, and the sensor 73 senses that there are cards 50 present in the cassette 80. The plotter 10 is then cycled to strip off the blank card on the bottom of the stack 88, such that the next cycle will feed an aperture card 50 having an unexposed microfilm 54 in its aperture 53 (see FIG. 3).

When computer data is to be plotted on an aperture card 50, the pick off motor 60 and the feed motor 75 are started together This strips off the bottom card 50 from the cassette 80 in the cassette mount module 12, and feeds it into the carriage module 14. When the leading edge 51 of the card 50 is sensed by the sensor assembly 100 of FIG. 7, the pick off motor 60 is stopped. The pick off motor 60 has a oneway clutch such that it free wheels as the feed motor 75 continues to run. This allows only one card 50 to be stripped out of the cassette 80 by the pick off motor 60.

Referring to FIGS. 7-12, when a card 50 starts to feed into the carriage module 14, the pinch solenoid 98 is activated, and the card feed motor 97 is started, feeding the card from the cassette module 12 into the carriage module 14. When the trailing end 57 (see FIG. 3) of the card 50 clears the hanging flag 110 of the sensor assembly 100, the card feed motor 97 and the pinch solenoid are turned off, and the vacuum motor 32 (see FIG. 1) and the card bend motor 96 are started. At this point, the card 50 is held in the notch 112 of the movable guide member 101 and the guide member 156 of the platen assembly 150. The bend motor 96, assisted by the spring 172 and the spring means 103, causes the movable guide member 101 to move inwardly, and the kicker lever 176 to move up the inclined member 177, bending the card 50 upwardly The vacuum caused by the vacuum motor 33 of FIG. 1 sucks the card 50 into tight engagement with the curved portion 160 of the platen member 153. The bend motor 96 continues to run until the sensor 175 senses that the movable guide member 101 has returned to its original outward position. The stepper motor 95 is then stepped backward until the trailing end 57 of card 50 is again sensed by the sensor assembly 100. At this point, the card 50 will be exactly positioned for the laser scan module 16 to scan the microfilm 54 of the card 50. If the right sensor 144 senses the blade member 143 before the sensor assembly 100 senses the end of the card 50, it means that the card 50 cannot be positioned properly and an error condition is signaled.

When the card 50 is correctly positioned in the carriage module 14, the shutter motor 193 of FIG. 13 is energized, opening the shutter 192 of the laser module 16. The first line of pixels is then modulated onto the laser beam 162 and scanned onto the microfilm 54 by the spinning mirror 163. After each scan line, the stepper motor 95 is stepped such that the microfilm 54 is positioned for the next scan line from the spinning mirror 163. This process continues until the entire scan frame 55 of FIG. 4 is filled. If the blade member 143 is sensed by the left sensor 145 before the scanning process is finished, it signals that an error condition exists, and the scanning process is terminated.

When the scan frame 55 is filled, the shutter 192 of FIG. 13 is closed, shutting off the laser beam 162. The vacuum motor 32 of FIG. 1 is turned off, allowing the card 50 to drop with a blank portion of its leading end 51 between the pinch roller mechanism 118 and the drive wheels 120 (see FIG. 9). The pinch solenoid 98 is again activated, and the card feed motor 97 is started, thereby moving the card 50 over the table member 125 from the carriage module 14 into the dry developer module 18. After the card 50 has left the carriage module 14, the stepper motor 95 may be reversed, returning the platen assembly 150 to its starting position to receive a new card 50. This may be done by stepping the stepper motor 95 to the right until the blade 143 is sensed by the right limit sensor 144. The stepper motor may then be stepped a set number of steps to the left until the initial position of the platen assembly 150 is reached.

Returning to the plotting operation, the printer motor 248 of FIG. 17 is started, driving the card feed mechanism 202 of FIGS. 14 and 15. When the front sensor 255 of FIG. 17 senses the leading end 51 of the card 50, the printer motor 248 is stopped, positioning the microfilm 54 of the card 50 under the heater block 200 of FIGS. 14 and 15. The motor 205 is then energized to move the transport mechanism 201 of the dry developer module 18 to its uppermost position, stretching the microfilm 54 over the curved surface 238 of the heater block 200 (see FIG. 15), as previously discussed. When the sensor 212 senses that the transport mechanism 201 is at its uppermost position, the motor 205 is turned off for approximately 3.5 second, to develop the microfilm 54. The motor 205 is then again energized to lower the transport mechanism 201 and the card 50. When the sensor 212 senses that the transport mechanism 201 is at its lower position, the motor 205 is turned off and the printer motor 248 is turned on to move the card 50 through the printer module 20.

When the rear most sensor 256 senses the leading end 51 of the card 50, the exact position of the card 50 is known, and the clock pulses generated by the encoded disk 262 and optical decoder 265 of FIG. 18 are used to print a single line of title information of up to 80 characters in the title block area 56 of the card 50 (see FIG. 3). The card position detected by the sensor 256 is also used to determine when the card 50 has exited the aperture card plotter 10 at 26 (see FIG. 1). When the card 50 has exited the card path at 26, the printer motor 248 is turned off, and the aperture card plotter 10 is ready to process another card 50.

Thus, an aperture card plotter has been described which provides the aforementioned objects. It will be understood by those skilled in the art that the disclosed embodiment is exemplary only, and that the various elements disclosed may be replaced by equivalents without departing from the invention hereof, which equivalents are intended to be covered by the appended claims.

What is claimed is:

1. A plotter for recording an image on a recording medium of an aperture card, said plotter comprising:
   aperture card supply means for supplying the aperture card;
   carriage means having guide means aligned with said aperture card supply means for receiving therefrom the aperture card, a carriage exit aligned with said guide means, a recording station, and platen means for stepping the aperture card from said guide means to said carriage exit past said recording station in a plurality of steps;
   laser recording means including laser generating means for generating a laser beam, modulating means for modulating said laser beam with imaging data to be recorded on the recording medium of the aperture card, directing means for directing the modulated laser beam to the recording station of said carriage means, and scanner means for scanning a line of imaging data via said laser beam onto the recording medium each time said platen means steps said aperture card one step past said recording station; and
   dry developer means having an entrance aligned with said carriage exit for receiving therefrom the aperture card, heating means, positioning means aligned with said entrance for positioning said aperture card received by said entrance such that it is positioned adjacent to said heating means for developing said recording medium, and dry developer exit means aligned with said positioning means for ejecting the aperture card from said dry developer means after said recording medium is developed.

2. The plotter of claim 1 further comprising:

printer means aligned with said dry developer exit means, said printer means having a printer entrance for receiving the aperture card from said dry developer means, a printer exit for providing an exit for the aperture card from said printer means, a print station between said printer entrance and said printer exit for printing titling information on the aperture card, and card feed means for advancing the aperture card from said printer entrance to said printer exit.

3. The plotter of claim 1 further comprising:
a cassette for holding a plurality of aperture cards;
cassette receiving means in said aperture card supply means for receiving said cassette;
pick off means in said aperture card supply means for stripping a single aperture card from said cassette; and
card supply feeding means in said aperture card supply means and aligned with said pick off means for feeding the aperture card stripped out of said cassette and supplying it to said guide means of said carriage means.

4. The plotter of claim 3 wherein said cassette includes a bottom member having a lateral slot therein, and said pick off means comprises:
a pick off roller assembly in said aperture card supply means and extending through the slot in said bottom member when said cassette is in said cassette receiving means; and
a pick off motor driving said pick off roller assembly such that the aperture card in said cassette adjacent said bottom member and in contact with said pick off roller assembly is stripped out of said cassette and fed to said card supply feeding means.

5. The plotter of claim 4 further comprising a pivoted gate member on which said pick off roller assembly and said pick off motor are mounted, said pivoted gate member being movable from a first position wherein said pick off roller assembly is partially in said slot for contacting the aperture card in said cassette adjacent said bottom member, to a second position wherein said pick off roller assembly is withdrawn from said slot.

6. The plotter of claim 5 further comprising a spring biasing means for urging said pivoted gate member toward its first position.

7. The plotter of claim 6 wherein said pick off motor includes a one way cluch which free wheels as said card supply feeding means feeds an aperture card stripped out of said cassette to said guide means such that only a single aperture card is stripped out of said cassette by said pick off roller assembly.

8. The plotter of claim 7 wherein said aperture card supply means includes:
a feeler member extending into said cassette when said cassette is in said cassette receiving means; and
card sensor means connected to said feeler member for sensing the presence of aperture cards in said cassette.

9. The plotter of claim 8 wherein said card supply means includes second spring biasing means connected to said feeler member for applying loading force via said feeler member to aperture cards in said cassette.

10. The plotter of claim 1 wherein said carriage means includes a stepper motor connected to said platen means for stepping said platen means past said recording station.

11. The plotter of claim 10 wherein said scanner means is a spinning mirror having a point of reflection which reflects said modulated laser beam across the recording medium transverse to the direction of travel of the aperture card as it is stepped by said stepper motor past said recording station.

12. The plotter of claim 11 wherein said platen means has a longitudinal axis and a transverse axis, said platen means being moved along its longitudinal axis by said stepper motor, said platen means further having a holding surface which is arcuate along its transverse axis and straight along its longitudinal axis, said holding surface being centered in the transverse direction over said spinning mirror such that said spinning mirror scans said modulated laser beam transversely along a scan line across said holding surface, with the distance from said point of reflection of said spinning mirror to the holding surface of the platen member being equidistance along the scan line.

13. The plotter of claim 12 wherein said guide means further comprises:
sensor means between said aperture card supply means and said carriage means for sensing the presence of the aperture card received from said aperture card supply means such that the recording medium of the aperture card may be positioned under said holding surface of said platen member.

14. The plotter of claim 13 further comprising holding means in said carriage means for holding the aperture card tightly engaged with said holding surface of said platen means as said platen means is stepped past said recording station.

15. The plotter of claim 14 wherein said holding means includes of plurality of vacuum slots in the surface of said holding surface, a vacuum pump, and connection means connecting said vacuum pump to said vacuum slots such that said vacuum pump sucks the aperture card into tight engagement with said holding surface when said sensor means senses that the recording medium of the aperture card is positioned under said holding surface.

16. The plotter of claim 15 further comprising:
a longitudinal member spaced from and parallel to the longitudinal axis of said platen means;
card bending means connected to said longitudinal member for moving said longitudinal member laterally toward the longitudinal axis of said platen means such that the aperture card is bent; and
kicker means connected to said card bending means for bending the aperture card toward said holding surface when said card bending means bends the aperture card.

17. The plotter of claim 16 wherein said card bending means comprises:
a card bend motor;
a motor shaft turned by said card bend motor;
an eccentric wheel connected to said motor shaft and turned thereby;
a rod having one end urged by said eccentric wheel for converting the rotation of said motor shaft to lateral motion, and a second end connected to said longitudinal member such that said longitudinal member is moved laterally as said motor shaft is turned;
a support member for supporting said rod and allowing lateral movement thereof; and
spring means having one end connected to said rod and a second end connected to said support member for urging said one end of said rod into engagement with said eccentric wheel.

18. The plotter of claim 17 wherein said kicker means comprises:
a lever member connected to said rod; and
an inclined plane member connected to said support member and aligned with said lever member such that when said rod moves laterally in a first direction said lever member moves up said inclined plane member into contact with the aperture card for bending the aperture card toward said holding surface, and when said rod moves in a second, opposite direction, said lever member moves down said inclined plane away from the aperture card.

19. The plotter of claim 18 further comprising card feed means in said carriage means between said platen means and said carriage exit and aligned with said guide means such that a portion of the aperture card received by said guide means from said aperture card supply means is inserted into said card feed means, said card feed means for transporting the aperture card from said platen means to said carriage exit after the aperture card has been stepped past said recording station by said stepper motor.

20. The plotter of claim 19 wherein said card feed means comprises:
a card feed motor;
drive roller means connected to said card feed motor and located between said carriage exit and said platen means;
a pinch solenoid including a plunger having a first position and a second position; and
pinch roller means connected to said plunger and movable from a first position engaged with said drive roller means when said plunger is in its first position to a second position not engaged with said drive roller means when said plunger is in its second position,
such that the aperture card, when it is between said pinch roller means and said drive roller means when said plunger is in its first position, may be transported through said carriage means by said card feed motor.

21. The plotter of claim 2 wherein said positioning means includes first sensor means between said dry developer means and said printer means for sensing when the recording medium of the aperture card is adjacent said heating means; and
said dry developer means includes transport means for transporting the recording medium into contact with said heating means responsive to said first sensor means.

22. The plotter of claim 21 further comprising:
second sensor means between said first sensor means and said card feed means for sensing the aperture card as it leaves said dry developer exit means; and
timing means driven by said card feed means and responsive to said second sensor means for timing the printing of said titling information on the aperture card at said print station as the aperture card is advanced from said printer entrance to said printer exit.

23. A plotter for recording data from a modulated laser beam onto a recording medium mounted covering the aperture of an aperture card wherein the aperture is located toward one end of the aperture card with a blank margin on either side of the aperture, said plotter comprising:
aperture card supply means for supplying the aperture card from a plurality of aperture cards;
carriage means having a recording station and platen means for stepping the aperture card past said recording station;
laser scanning means for scanning a row of data from the modulated laser beam laterally across the recording medium through said recording station as the recording medium is stepped past said recording station by said platen mean;
dry developer means for developing the data recorded on the recording medium by said laser scanning means;
a feed path from said aperture card supply means through said carriage means and said dry developer means; and
transport means for singularly transporting the aperture card along said feed path from said aperture card supply means, through said carriage means and said dry developer means.

24. The plotter of claim 23 wherein said feed path includes a pair of spaced apart guiding surfaces for supporting the blank margins on each side of the aperture as the aperture card is transported along said feed path, and a lower trough portion between said guiding surfaces for allowing the recording medium to be transported over said lower trough portion without contacting said guiding surfaces.

25. The plotter of claim 24 wherein said transport means includes a plurality of feed roller assemblies spaced along said feed path, each of said feed roller assemblies including a pair of spaced apart feed rollers, a pair of spaced apart pinch rollers urged into engagement with said feed rollers, and feed roller drive means for driving said feed rollers, said feed rollers and said pinch rollers being spaced apart to contact the aperture card along the blank margins on either side of the aperture as the aperture card is driven past said feed roller assemblies by said feed roller drive means.

26. The plotter of claim 25 further comprising printer means along said feed path for printing titling information on the aperture card as it is transported by said transport means along said feed path.

* * * * *